3,393,622
PHOTOGRAPHIC CAMERA WITH MEANS FOR
INDICATING DEPTH OF FIELD RANGES
Ulrich Schöttle, Stuttgart, and Horst Rockstroh and Hans-Dietrich Becker, Stuttgart-Moehringen, Germany, assignors to Zeiss Ikon Aktiengesellschaft, Stuttgart, Germany, a corporation of Germany
Filed Dec. 13, 1965, Ser. No. 513,305
Claims priority, application Germany, Dec. 22, 1965,
Z 11,242
2 Claims. (Cl. 95—44)

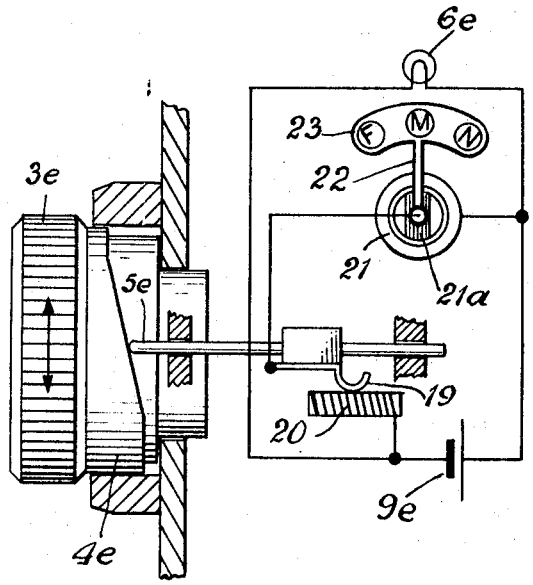
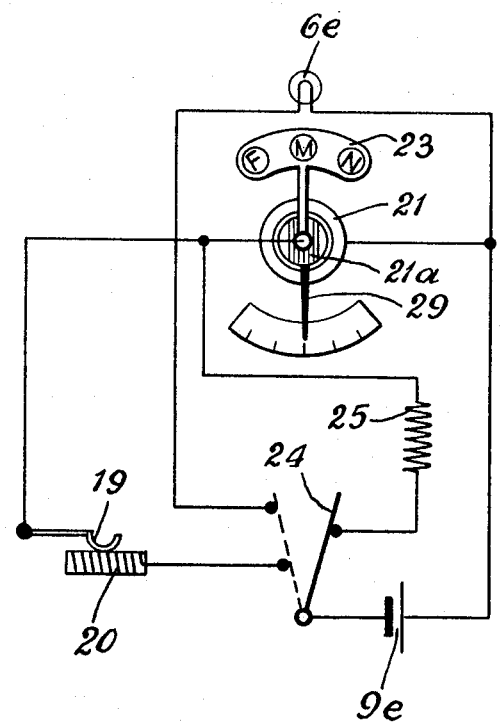

ABSTRACT OF THE DISCLOSURE

A photographic camera provided with a viewfinder and a distance adjusting device. Apparatus for indicating the depth of field ranges is formed by a plurality of lamps arranged in the viewfinder. The lamps are connected with the distance adjusting device in an electric circuit containing a source of current and a number of fixed contacts, one for each lamp. The distance adjusting device is operatively connected with a movable contact adapted to be connected with any one of said fixed contacts for energizing the lamp in order to indicate the depth of field range to which the distance adjusting device has been set.

---

The invention relates to photographic cameras in which the distance scale is provided with so-called short range points and long range points which in conjunction with certain predetermined diaphragm values define several depth of field ranges for exposures with a small distance between the camera and the object (short range point) and a greater distance between the camera and the object, respectively (long range point).

According to physical laws the depth of field becomes the greater the smaller the focal length has been selected. Narrow film cameras have, as is known, very small focal lengths so that a short range or long range adjustment, respectively, encompasses depth of fields which extend practically over the entire exposure range and is almost completely independent of the adjusted diaphragm values.

But also for photographic cameras to whose objectives in view of their great focal lengths the above condition does not apply, the adjustment by means of this short range mark or long range mark method still has its advantages. Since in most cases the distance, which is measured by a range finder, is of less interest than the range within which a sharp exposure can be produced with a certain diaphragm value, it may be advantageous to make use of the indication of depth of field ranges in spite of the use of a focusing means (range finder, ground glass or deflecting optical wedges).

It is the object of the invention to create means for indicating different depth of field ranges in dependence of the distance.

According to the invention, there is used in the camera, preferably in the viewfinder, for the purpose of indicating different depth of field ranges in dependence of the adjusted distance at least one lamp connectible to a source of current which indicates the depth of field that corresponds to the position of the distance adjusting members.

The required indicating lamps are preferably supplied with current by one common source of current and are connected to it by switches which are actuated directly or indirectly by the distance adjusting members in dependence of their position.

A different means to indicate the depth of field present at any one time consists in the employment of a movable disc provided with reference symbols and arranged in front of a lamp connected to a source of current, which lamp is controllable in dependence of the distance adjustment members so that upon adjustment of the latter to a certain depth of field range the reference symbol representing this range is moved in front of the lighted lamp.

As indication marks denoting the several distance ranges may serve letters or symbols which indicate a close-up range, a medium distance range, or a landscape range.

If the objective or a part of the same, for instance its front lens, is manually adjusted to the distance of the object to be photographed, this adjustable member will be equipped with the necessary control means, as for instance a cam by which the indicating character, symbol or the like, for the depth of field range adjusted at any one time is made visible. If the distance is determined by a range finder, any one adjustable member in the operative connection between the range finder and a distance adjusting ring on the objective may serve as a carrier for the required control means.

In the following will be described different methods of how this control can be effected by the distance adjusting ring.

According to the invention, the rotary disc provided with indication symbols may be so constructed that in an uncontrolled position one symbol is lighted and the distance adjusting means controls the rotary disc merely for the display of the other symbols. For example, the rotary disc may be disposed eccentrically so that, if for instance three symbols are used, the intermediate symbol is lighted when the rotary disc is in an uncontrolled position. Further, there may be provided suitable locking means to make sure that in the uncontrolled position the disc will always be in one and the same position.

The control of the rotary disc may be effected electromagnetically, whereby the electromagnets may be turned on or off by way of contacts provided on the distance adjusting ring. Coincidentally, the source of current of the electromagnetic control may also serve for supplying the electric current for the signal lamps.

Although an electric transfer of the control impulses from the objective adjusting ring into the camera must be given preference, there may be cases in which a mechanical transfer of the control values supplied by the distance adjusting ring to the camera may be desired. This transfer may be effected, for example, by way of a flexible shaft.

Another mechanism for controlling the rotary disc, provided with indicating symbols, consists of fastening this disc to the shaft of a measuring instrument which is controlled by a variable resistance regulated by the distance adjusting members. As a variable resistance, the slide contact of which is controlled by a cam connected to the distance adjusting members, may be used as a potentiometer. A layer of different resistance values deposited on the distance adjusting ring may also serve as a variable resistance; and, these resistance values are scanned by contacts fixedly arranged in the proximity of the distance adjusting ring.

In order to prevent the signal device from being connected to a source of current even when no exposure is intended, an additional switch is provided for turning the signal circuit on and off. This switch is preferably coupled with a switch member for making the camera ready for operation. For example, this switch may be actuated by the release button before the shutter is released. In cameras in which the light measuring mechanism can be switched on in order to ascertain the light conditions before an exposure is made, this additional switch is coupled with the turning on of the light measuring mechanism so that not only the light conditions are determined before making an exposure, but also that depth of field is determined which is most favorable in each case.

When the camera is equipped with an objective of variable focal length, it may be advantageous to have the adjusted focal length or individual focal length ranges indicated as well as the depth of field ranges. The same is true for the indication of diaphragm values or diaphragm value ranges, respectively, that have been set. Therefore, according to the invention, the indication device arranged on the camera or more precisely, in the viewfinder, is made so as to be changed over to adjustment means for a change of the focal length or of the diaphragm values by way of contacts associated with the individual ranges of these adjustment devices, whereby means are provided for making visible only that group of reference symbols that are to indicate the respective depth of field.

If a rotatable disc provided with reference symbols is placed in front of a lamp connected to a source of current, the control means for rotating the disc are so constructed that they can be changed over to the adjustment means for the focal length and/or the diaphragm values, and additional means are provided which cover up that group of reference symbols on the disc which is not being used at the time. These means may be coupled with the change-over means which connect the indicating device with the control means of the range being used at any one time.

The invention will be described in further detail with reference to the accompanying drawings in which:

FIGS. 2 to 6 illustrate partly diagrammatic, partly in section different indicating means according to the invention, and FIG. 7 is a circuit diaphragm of the photographic camera provided with the indicating means according to the invention.

Figure 1:
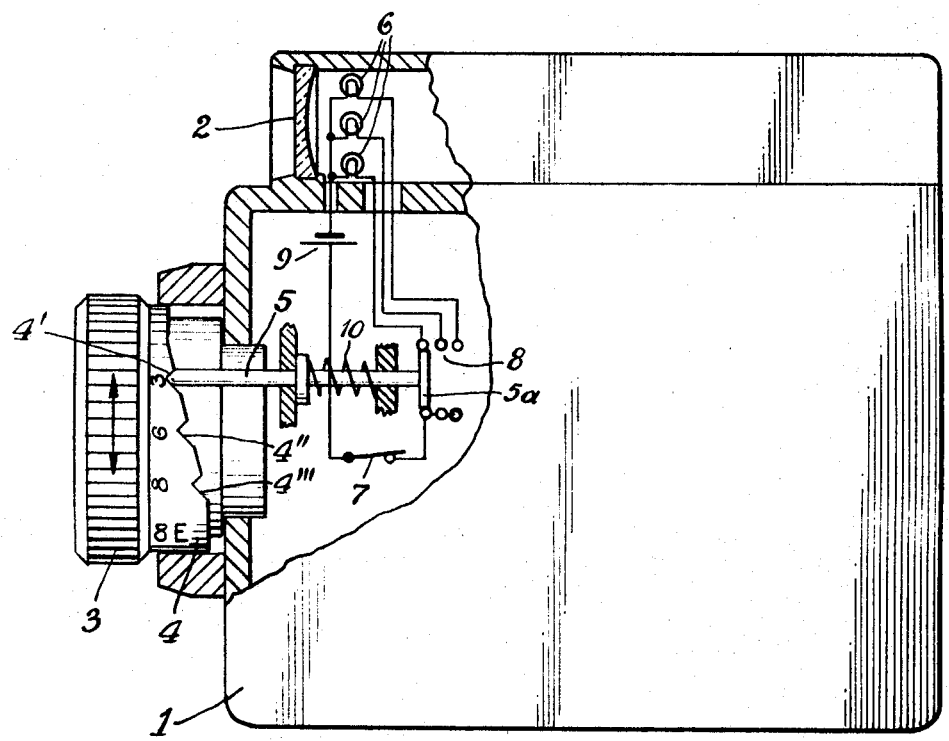
FIG. 1 illustrates diagrammatically in a side elevation view, with parts in section, a photographic camera provided with the indicating means according to the invention.

Referring to FIG. 1, in the camera 1 is provided with a viewfinder 2 at its top wall or below the top wall, a photographic objective on the front wall which is adjusted to the required distance by means of the adjusting ring 3 which concentrically surrounds the optical axis of the photographic objective, and the lenses of which are not shown. Connected to the adjusting ring 3 is an annular cam body 4 which is scanned by an axially displaceable pin 5 disposed parallel to the optical axis. It may be useful to provide the cam body 4 with recesses 4', 4" and 4''' at those places which define the different depth of fields. Arranged in the viewfinder 2 are three signal lamps 6 which are alternately connected to the battery 9 by way of the serially connected switch 7 and the step switch 8. The latter is closed by a contact 5a mounted on the pin 5 which is urged by a spring 10 in engagement with the cam 4. According to the adjusted distance, which corresponds to a certain predetermined depth of field range, one of the lamps 6 in the viewfinder 2 lights up. These lamps differ from one another in their color, shape or by masks combined with the lamps so that the signal lighting up in the viewfinder indicates to what depth of field the camera objective has been adjusted.

Since the photographic objective remains in a position to which it has been adjusted along the distance scale and which is within one of the depth of fields to be indicated regardless of whether or not an exposure is intended to be made, one of the signal lamps 6 would always be connected to the battery and would soon exhaust it. In order to prevent this, the switch 7 is provided which is not operated until immediately before an exposure is made. It is therefore expedient to arrange this switch 7 in the control path of the camera release in such a manner that it is closed before the release operates the shutter. If the camera is provided with an exposure measuring device or an automatic exposure measuring device which may be operated separately from the shutter release, the switch 7 may be coupled with the switch associated with the mentioned exposure measuring devices.

Figure 2:
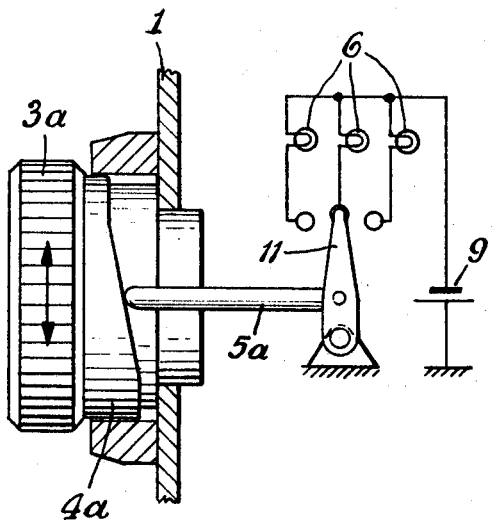
Figure 3:
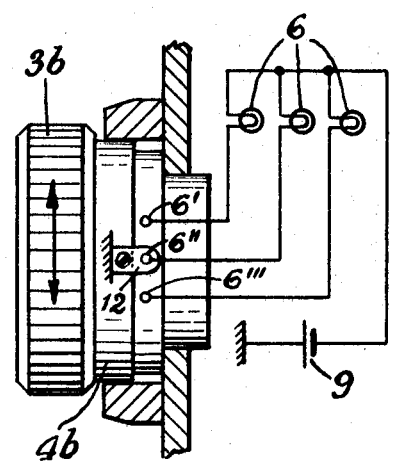

As illustrated in FIG. 2, the axially shiftable rod 5a controlled by the cam body 4a on the distance adjusting ring 3a actuates a rotatable switch 11. The cam body 4a is not provided with notches. It may be useful to so arrange the switch 11 that in transition positions it is able to connect two lamps to the source of current at the same time whereby it is indicated that the distance adjusting ring 3a is in a transition position between two depths of field ranges. These considerations are also reflected by the switch arrangement as illustrated in FIG. 3 in which the distance adjusting ring 3b has a cylindrical collar 4b thereon carrying an axially extending contact 12 which is in slidable engagement with fixed contacts 6', 6" and 6''' mounted in the camera.

In the embodiments of the invention described so far the necessary switches may be positioned in the immediate proximity of the camera objective so that the connection between the switch and the signal lamps may be effected by electric wires placed in any desired manner. This holds no longer in the embodiments illustrated in FIGS. 4 and 5.

Figure 4:
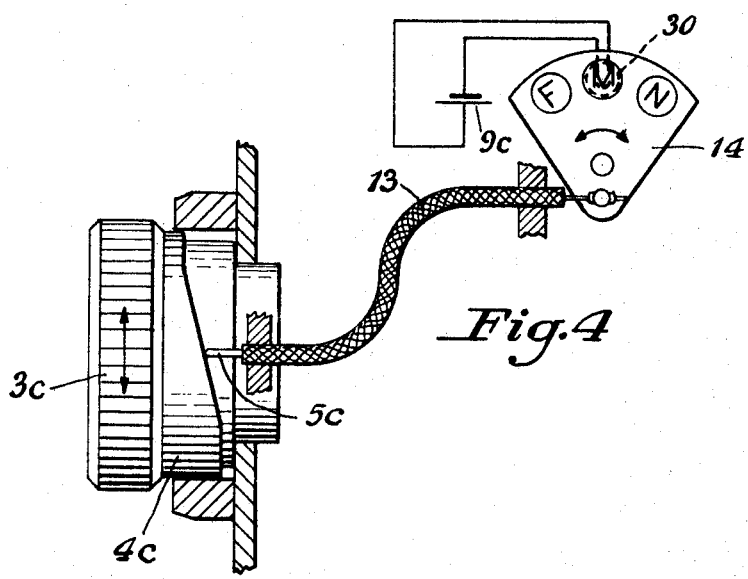

In FIG. 4 the cam body 4c on the distance adjusting ring 3c is scanned by a wire 5c which when moved lengthwise in the flexible sheath 13 controls a sector-shaped signal disc 14 behind which is arranged a single signal lamp 30 which is permanently connected to the battery 9c. The signal disc 14 is provided with transparent symbols standing for the adjusted depth of field range, as for instance N stands for the near distance range, M for the medium distance range, and F for the far distance range.

Figure 5:
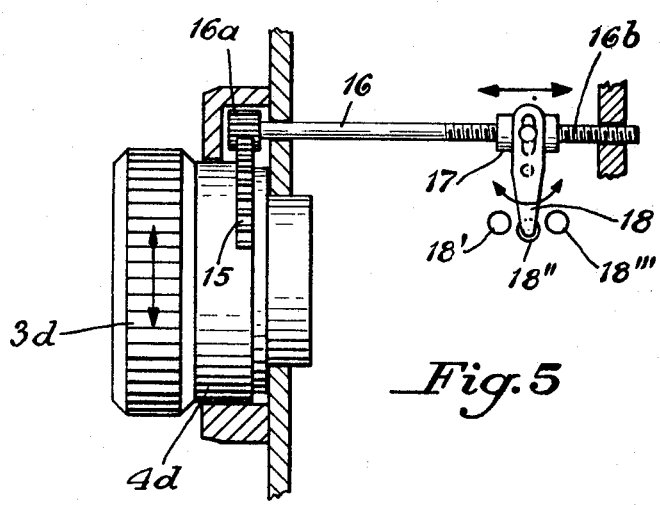

According to FIG. 5 the distance adjusting ring 3d has its cylindrical collar 4d provided with the toothed segment 15 which engages a pinion 16a on a shaft 16 when the distance adjustment is changed. Disposed on a threaded portion 16b of the shaft 16 is a nut 17 which is secured by known means against rotation so that it is displaced only along the threaded portion 16b of the shaft 16 when said shaft is rotated by the toothed segment 15. The nut 17 adjusts a pivotally mounted switch arm 18 which, as in the previous embodiments, is adapted to engage switch contacts 18', 18" and 18''' for selectively causing one of the three mentioned signal lamps to light up.

According to FIG. 6, the axially shiftable pin 5e actuates in dependence of the position of the cam body 4e and the distance adjusting ring 3e a slide contact 19 of the potentiometer 20 which is disposed in an electrical circuit which includes also the battery 9e and the movable measuring coil 21a of the instrument 21. The pointer 22 of the instrument 21 is connected to the signal flag 23 carrying a number of transparent symbols F, M and N which in dependence of the controlled potentiometer are alternatingly moved in front of the lamp 6e. The signal lamp 6e is energized by the same source of current which also supplies the voltage for the measuring coil.

In order to avoid that for the indication of the depth of field ranges another measuring instrument is needed in addition to that required for the light measurement, the circuit diagram illustrated in FIG. 7 provides one measuring instrument for both the depth of field indication and the light indication. According to the position of the switch 24 either the photoelectric resistance 25, the measuring coil of the measuring instrument 21 and the battery 9e are serially arranged, or the potentiometer 19, 20 with the measuring coil of the instrument 21 and the battery 9e are serially arranged, whereby in the latter case the signal lamp 6e is additionally connected to the battery 9e. For the light measurement serves as a variable resistance the photoelectric resistance 25 and the indicator hand 29 on the coil 21a, and for indicating the depth of field serves the potentiometer 19, 20 which may be replaced by fixed resistances. Obviously, additional switch means may be employed in known manner for the light measurement as well as for the indication of the depth of field range so as to adapt the measuring instrument to the different functions.

What we claim is:

1. A photographic camera provided with a photographic objective, a view finder, distance adjusting means and means indicating the depth of field ranges, including a plurality of lamps arranged within said viewfinder, and a source of current for energizing said lamps, said lamps being connected to contact members which are associated with different depth of field ranges and which are adapted to be engaged by control means operated by said distance adjusting means, whereby each lamp when energized indicates a predetermined depth of field range.

2. A photographic camera provided with a photographic objective, a viewfinder, distance adjusting means and means indicating the depth of field ranges, including a plurality of lamps arranged within said viewfinder, and a source of current for energizing said lamps, said distance adjusting means comprising, a manually rotatably adjustable ring arranged on said photographic objective, a contact member operated by said rotatably adjustable ring, and a plurality of fixed contacts in said camera adapted to be selectively engaged by said contact member, each one of said fixed contacts being connected by circuit means with a different lamp, each of which when energized indicating a predetermined depth of field range.

References Cited

UNITED STATES PATENTS 2,919,623   1/1960   Tronnier _____ 95—44 XR
2,996,968   8/1961   Lunzer _____ 95—45 XR NORTON ANSHER, *Primary Examiner.*

GARY M. HOFFMAN, *Assistant Examiner.*

UNITED STATES PATENT OFFICE
CERTIFICATE OF CORRECTION

Patent No. 3,393,622                      July 23, 1968

Ulrich Schöttle, et al.

It is certified that error appears in the above identified patent and that said Letters Patent are hereby corrected as shown below:

In the heading to the printed specification, line 9, "Dec. 22, 1965" should read -- Dec. 22, 1964 --.

Signed and sealed this 25th day of November 1969.

(SEAL)
Attest:

Edward M. Fletcher, Jr.                 WILLIAM E. SCHUYLER, JR.
Attesting Officer                           Commissioner of Patents